United States Patent Office 3,493,557
Patented Feb. 3, 1970

3,493,557
TRIALKYL STANNYLOXY DERIVATIVES OF FRUCTOSE, CYCLIC MERCAPTOLS AS PESTICIDES
Hugh E. Ramsden, Scotch Plains, N.J., assignor to Esso Research and Engineering Company, a corporation of Delaware
No Drawing. Filed Oct. 26, 1966, Ser. No. 589,536
Int. Cl. C07d *103/00;* A01m *9/12*
U.S. Cl. 260—209                           6 Claims

ABSTRACT OF THE DISCLOSURE

Fructose is reached with a dimercaptam to form a fructose intermediate which is thereafter reacted with trialkyl tin compounds to yield highly selective pesticides, particularly herbicides.

---

This invention relates to the preparation of new and valuable organotin compounds. More particularly, this invention relates to the reaction of trialkyl tin compounds with fructose derivatives to form novel compounds having the generic formula:

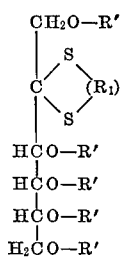

wherein R′ is selected from the group consisting of hydrogen and trialkyl tin radicals and at least one R′ is a trialkyl tin radical and $R_1$ is selected from the group consisting of divalent aliphatic, cycloaliphatic, aromatic and alkylaromatic radicals. These novel compounds find usefulness as pesticides and/or herbicides for the destruction of harmful weeds.

The prior art has long recognized the utility of organotin compounds as pesticides and/or herbicides. However, many such compounds have usually shown a non-selective and indiscriminate pesticidal and/or herbicidal activity, e.g., valuable plant life as well as unwanted plant life is destroyed by such compounds. Furthermore, many organotin compounds show a marked toxicity towards warm blooded animals. Consequently, the use of organotin compounds has not been widespread. Thus, the search has continued for a relatively non-toxic compound which possesses a high degree of selectivity in the destruction of weeds, insects, pests, nematodes and the like, while allowing valuable plant life to flourish and mature.

It has now been discovered that the novel compounds formed by the reaction of trialkyl tin compounds and fructose derivatives, i.e. fructose dimercaptohydrocarbyl cyclic mercaptoles, have excellent pesticidal and herbicidal activity while possessing the necessary low degree of toxicity to warm blooded animals and a high degree of selectivity to the destruction of unwanted plant and pest life.

Thus, in accordance with this invention, a novel fructose derivative, i.e., fructose dimercaptohydrocarbyl cyclic mercaptole, is first prepared by reacting fructose with a dimercaptan. This intermediate compound is then reacted, with a trialkyl tin compound, i.e., trialkyl tin halide, trialkyl tin oxide, to form the novel compounds known as fructose (dimercaptohydrocarbyl) mercaptole oxy trialkyl tins, which have the generic formula:

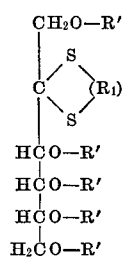

wherein R′ is selected from the group consisting of hydrogen and trialkyl tin radicals each alkyl group having 1–10 carbon atoms, preferably 1–6 carbon atoms, more preferably 1–4 carbon atoms and at least one R′ is a trialkyl tin radical; and $R_1$ is selected from the group consisting of $C_1$–$C_{20}$ divalent aliphatic, cycloaliphatic, aromatic, and alkylaromatic radicals, preferably $C_2$–$C_{10}$ aliphatic radicals, more preferably $C_2$–$C_8$ aliphatic radicals. The intermediate fructose derivative is easily prepared by reacting fructose with a dimercaptan, preferably in an alcoholic (with trace of acid catalyst) solvent. Fructose is a commercially available sugar which occurs widely in fruits and, when combined with glucose, in the disaccharide sucrose, i.e., common table sugar. Fructose, a 2-ketohexose, contains the reactive >C=O (carbonyl) group which readily combines with dimercaptans to form cyclic derivatives. Thus, the compounds formed will have the structural formula:

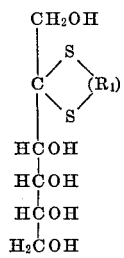

wherein $R_1$ is as previously described. Generally, any dimercaptan that will result in the formation of a cyclic structure of the formula:

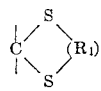

having 4 to about 10 members, may be used. However, 1,2- and 1,3-dimercaptans are preferred. Thus, the preferred cyclic structures will contain 5 to 6 members. Rings having more than 6, or less than 5 members, are less desirable since they are more difficult to form and result in significantly lower yields of the intermediate. Illustrative of the dimercaptans that may be employed are: 1,2-dimercapto ethane, 1,2-dimercapto propane, 1,2-dimercapto butane, and its homologous series; 1,3-dimercapto propane, 1-3-dimercapto butane, and its homologous series; 1,2- or 1,3-dimercapto cyclopentanes, hexanes, heptanes, etc. Preferred compounds, however, are the 1,2- and 1,3-dimercapto alkanes having from 2 to about 10 carbon atoms, more preferably 2 to about 8 carbon atoms.

The intermediate fructose derivative may be prepared by reacting fructose with the dimercaptan, with or without the presence of a solvent, at temperatures ranging from about room temperature, i.e. 18–260 C. to about 150° C. At temperatures in the higher end of the range, the sugar trends to saccharify before it reacts with the dimercaptan and, therefore, temperatures of about room temperature to about 100° C. are preferred. Pressures are not critical and may vary widely, but preferably are in the range of from about 1 to about 10 atmospheres.

The molar ratio of fructose to dimercaptan should be about stoichiometric, however, it is normally advisable to employ an excess of fructose to insure complete reaction of the dimercaptan and eliminate undesirable odors. Thus, molar ratios of fructose to dimercaptan of 1/1 to 10/1, preferably 1/1 to 5/1, and more preferably 1/1 to 2/1 may be employed.

While not essential the reaction is preferably carried out in the presence of a solvent. The solvent should be inert with respect to the reactants and may be benzene, alcohols, e.g. methanol, ethanol, propanol, isopropanol, etc., ethers, e.g. tetrahydrofuran, dioxane, etc. The reaction is normally catalyzed by small amounts of mineral acids, e.g. HCl, $HNO_3$, $H_2SO_4$, $H_3PO_4$, etc. and is complete in anywhere from a few minutes to a few hours, e.g. 5 min. to 2 hours. The acid catalyst is normally present in catalytic amounts, i.e. 0.05–5%, based on dimercaptan, preferably 0.1 to 0.5%. The intermediate compound is quite stable and may be stored for long periods at room temperatures.

The intermediate compound is then reacted with a trialkyl tin compound, e.g. trialkyl tin halide or trialkyl tin oxide, to form the novel compounds of this invention which are useful as pesticides and herbicides. Temperatures are not critical and may vary widely. However, temperatures over about 100° C. tend to darken the product but do not affect its activity. Temperatures of 0–100° C. are preferred, and 20–80° C. still more preferred. Pressure is not critical and may also vary over wide ranges, e.g. about 1–10 atmospheres.

The trialkyl tin compounds may be halogen or oxygen derivatives, e.g. trialkyl tin chloride, trialkyl tin bromide, trialkyl tin oxide. The trialkyl tin halides can be prepared in accordance with the process of U.S. Patent No. 3,067,- 226 and may be represented by the formula: $(R')_3SnX$ wherein $R'$ is a $C_1$–$C_{10}$ alkyl radical, preferably a $C_1$–$C_6$, more preferably $C_1$–$C_4$ alkyl radical and X is a halogen, i.e. chloride, bromide, fluoride, iodide, the chloride being preferred. The trialkyl tin oxides may be represented by the formula: $[(R_1')_3Sn]_2O$, wherein $R'$ is as described. The molar ratio of trialkyl tin radical to fructose intermediate is not of critical importance and can range widely, preferably, however, the molar ratio should range from about 1/1 to about 10/1 or higher. Since the trialkyl tin radical can replace on hydrogen on each of the first, third, fourth, fifth or sixth carbons of the fructose intermediate, increasing molar ratios will lead to increased substitution of the intermediate compound. Thus, if one mole of fructose intermediate is completely reacted with one mole of trialkyl tin, one hydrogen will be replaced, 2 moles will replace two hydrogens and so on. However, the novel compounds of this invention are active as herbicides and/or pesticides so long as at least one hydrogen is replaced by a trialkyl tin radical. Particularly preferred molar ratios of trialkyl tin to intermediate are therefore, about 3/1 to 1/1, and most preferably about 2/1 to 1/1. When the halogen derivative is employed, amounts of the halogen acid corresponding to the number of moles of fructose compound reacted will form. It is desirable although not absolutely essential in this case to employ a base to neutralize any acid formation. At least a stoichiometric amount of base, relative to the fructose intermediate, should be employed. However, an excess is desirable, and a molar ratio of base to intermediate of 1/1 to 100/1, more preferably 1/1 to 10/1 is employed. Bases which may be employed are generally characterized as Lewis bases and are illustrated by: pyridine, tertiary amines, e.g. triethylamine, however, inorganic bases such as $Na_2CO_3$, $NaHCO_3$, $NH_3$ may also be used. It is only important that the base employed to a base stronger than the trialkyl tin. Such compounds will be well known to those skilled in the art.

The use of a base may be eliminated by employing the trialkyl tin oxides. The oxides are easily formed by reacting the halogen compound with an anqueous base, e.g. NaOH, $NaHCO_3$, etc. Employing the oxide leads to the formation of water as the only side product during the reaction and base neutralization is not necessary.

Inert solvents may be employed, if desired, but are not necessary. The Lewis bases, when utilized in the larger amounts, may also serve as the solvent medium. Other solvents that may be used include acetone, benzene, toluene, ethers, e.g. tetrahydrofuran, dioxane and diglyme, alcohols, e.g. methanol, ethanol and the like.

The product may be recovered by filtering the reaction product at room temperature to remove the residue, since the product is normally liquid at room temperature. Solvents, when used, are normally evaporated prior to filtering.

The novel compounds of the present invention can be used as pesticidal or herbicidal compositions in either a solid or liquid form and employed for pre-emergence or postemergence uses. When used as a solid, the compounds may be reduced to an impalpable powder and applied as a dust or mixed with a solid carrier such as clay, talc or bentonite, as well as other inert carriers known in the art. The novel compounds can also be applied as a spray in a liquid carrier either as a solution in a solvent or in an emulsion in a non-solvent, such as water. In the diluted solid or liquid form the compounds of the present invention can be employed in an amount of about 0.0001 to 5.0 wt. percent, or more, based on inert carrier. When using in liquid form, preferred concentrations range from 0.0001 to 5.0 wt. percent more preferably 0.05–0.5 wt. percent. When used in solid form, preferred concentrations range from 0.25% to 20%, more preferably, 0.5–7.5 wt. percent. When applied as a liquid or solid, whether as an emulsion or dust, a concentration of about 0.5–20 lb./acre of affected area may be employed. Typical liquid solvents include acetone, cyclohexanone, alcohols, and kerosenes, etc. Suitable wetting agents and emulsifying agents can also be employed in preparing the pesticidal or herbicidal compositions. These compounds may also be admixed with carriers that are themselves pesticides or herbicides.

The inventive process is more particularly described in the following examples which are intended as illustrative only since modifications and variations therein will be apparent to those skilled in the art.

EXAMPLE 1

Fructose 1,3-dimercaptopropane cyclic mercaptole

A mixture of 1 mole (180 g.) of fructose, 1 mole (108 g.) of 1,3-dimercaptopropane, 500 ml. methanol, and 1 ml of 12 N hydrochloric acid was stirred and heated in a one-liter Ehrlenmeyer flask on a steam bath to gentle reflux until the fructose dissolved and a clear solution resulted. The mixture was then evaporated to remove the methanol, the product being recovered as a viscous light yellow oil, with a sulfur analysis close to theory.

Alternatively, in several other preparations, the clear solution was treated with 1 gram of sodium bicarbonate and filtered prior to evaporation.

EXAMPLE 2

Fructose 1,2-dimercaptopropane cyclic mercaptole

Fructose, 1 mole (180 g.), 1 mole (108 g.) of 1,2-dimercaptopropane, 400 ml. of methanol and 20 drops of concentrated hydrochloric acid was heated in an Ehrlenmeyer flask on a steam bath for one hour fifty minutes (one hour after complete solution). Then 2 grams of sodium bicarbonate was added, the mix filtered and evaporated to yield a yellow liquid product. Yield was above 95%.

EXAMPLE 3

Bistributyltin fructose 1,3-dimercaptopropanemercaptole

To a stirred mixture of 0.5 mole (135.0 g.) of fructose 1,3-dimercaptopropane cyclic mercaptole and 1.0 mole (101.0 g.) of triethylamine in 100 ml. of benzene and 600 ml. of acetone in a one-liter, 4-neck flask equipped with a thermometer, dropping funnel, reflux condenser and anchor stirrer was added 1.0 mole (325.7 g.) of tributyltin chloride over a period of 5 hours. The mixture was then heated at 43° C. for about 1½ hours. Then the mixture was cooled and vacuum evaporated in a rotary film evaporator to yield a viscous dark colored liquid product plus a small amount of triethylamine hydrochloride which was separated out. Yield of product was 82.8%.

*Analysis.*—C, 44.39; H, 8.27; Sn, 30.2. Theory: C, 46.7; H, 8.3; Sn, 28.0.

EXAMPLE 4

Bis (tributyltin) fructose 1,2-dimercaptopropane-mercaptole

Repetition of Example 2 using 0.1 mole fructose, 1,2-dimercaptopropane cyclic mercaptole, 0.2 mole of tributyltin chloride and 0.2 mole triethylamine with 100 ml. benzene in a 250 ml. 3-neck flask equipped with a reflux condenser, thermometer, dropping funnel and magnetic stirrer-hotplate stirred magnetic bar, yielded 73.3 grams of a brown oil, analyzing 30.8% tin versis a theory of 28.0%.

EXAMPLE 5

To a solution of 0.1 mole of fructose 1,3-dimercaptopropanemercaptole in 100 ml. of tetrahydrofuran is added 0.1 mole of bis (tributyltin) oxide, the mixture carried to a temperature of 45–50° C., stirred and heated for 1 to 2 hours at this temperature, cooled and evaporated in a rotary film evaporator to yield the product of Example 4.

EXAMPLE 6

Housefly tests: Fifty adults of the CSMA (Chemical Specialties Manufacturers' Association) strain are sprayed in a 2" x 5" diameter stainless steel cage faced on top and bottom with 14 mesh screen. Flies are retained in the cage in which they are sprayed for knockdown observations and 24-hours mortality determinations. Mortality which results from this test may be from residual contact as well as by direct contact spray.

Southern armyworm tests: Lima bean leaves sprayed on the dorsal and ventral surfaces are offered to ten larvae of the southern armyworm (late third instar) for a forty-eight hour feeding period. The feeding rate and mortality data are recorded as well as foliage injury, if any.

Pea aphid tests: Adult pea aphids are sprayed and transferred to sprayed pea plants and held for forty-eight hour mortality determinations. Foliage injury, if any, is recorded.

Spider mide tests: Lima bean plants are infested with fifty to one hundred adults of the strawberry spider mite, *Tetranychus atlanticus*, prior to testing. The infested plants are dipped into the test material and held for five days. Adult mortality as well as ovicidal action is noted.

Fructose (dimercapto propane) mercaptole bis oxytributyl tin was dissolved in acetone/$H_2O$ (50/50) to 0.35% concentration. At this concentration the following data were obtained:

| | |
|---|---|
| Houseflies | 100% kill in 2 hours. |
| Southern armyworms | 100% kill in 48 hours. |
| Pea aphids | 100% kill in 48 hours. |
| Mites | 100% kill in 5 days. |

EXAMPLE 7

Fungicidal activity

Test is as detailed in U.S.D.A. Circular No. 198, 1931—the Agarplate technique—the concentrations and results are given in the table.

| Active Compound, p.p.m. | Agarplate Width of Zone of Inhibition | | | | | | | | | |
|---|---|---|---|---|---|---|---|---|---|---|
| | A | B | C | D | E | F | G | H | I | J |
| 1,000 | 8 | 9 | 7 | 17 | 11 | 14 | 13 | 6 | 4 | 11 |
| 100 | 2 | 3 | 3 | 6 | 4 | 10 | 3 | 6 | 2 | 4 |

Code:
- A—*A. niger.*
- B—*Penicil. expansum.*
- C—*Botrytis allii.*
- D—*Glomerella cingulata.*
- E—*Sclerotinia frocticola.*
- F—*Helminthospor. avenae.*
- G—*Aspergillus flavus.*
- H—*Xanthomonas translucens.*
- I—*Corynebacterium michiganense.*
- J—*Pseudomonas solanacearum.*

EXAMPLE 8

Herbicidal activity vs. weeds

Pre-emergence tests: Duplicate paper pots filled with a sand and soil mixture are seeded with snap beans, cotton, corn, wheat, mustard, pigweed, crabgrass and foxtail. Immediately after seeding, the soil surface of each pot is sprayed with the sample solution. Growth occurs under artificial lighting with irrigation provided by placing the porous pots in a small amount of water in stainless steel trays. The plants and weeds are observed for a week to ten days and percent kill, injury and stand reduction recorded by a number system of 1—no damage to 5—complete kill.

Post emergence tests: Duplicate paper pots filled with a sand and vermiculite mixture are seeded with snap beans, cotton, corn, wheat, mustard, pigweed, crabgrass and foxtail. Growth occurs under artificial lighting with irrigation provided by placing the porous pots in a small amount of water in stainless steel trays. After the plants and weeds have reached a suitable size (about 10 days) they are sprayed with the samples. The plants and weeds are then observed for a week to ten days and percent kill and injury recorded by a number rating 1—no damage, to 5—complete kill.

| | Lbs./Acre | Mustard | | Pigweed | | Crabgrass | | Foxtail | |
|---|---|---|---|---|---|---|---|---|---|
| | | Pre | Post | Pre | Post | Pre | Post | Pre | Post |
| Compound [1] | 4 | 3 | 5 | 5 | 5 | 2 | 3 | 3 | 4 |
| | 20 | 5 | 5 | 5 | 5 | 4 | 4 | 5 | 5 |

Dilution Tests

| | Lbs./Acre | Mustard | | Pigweed | | Crabgrass | | Foxtail | |
|---|---|---|---|---|---|---|---|---|---|
| | | Pre | Post | Pre | Post | Pre | Post | Pre | Post |
| Compound [1] | 1 | 1 | 5 | 2 | 5 | 2 | 3 | 2 | 3 |

| | Lbs./Acre | Barnyd. Gr. | | Buckhorn | | Johnson Gr. | | Lambs Qtrs. | |
|---|---|---|---|---|---|---|---|---|---|
| | | Pre | Post | Pre | Post | Pre | Post | Pre | Post |
| Compound [1] | 1 | 3 | 1 | 2 | 3 | | 2 | 4 | 3 |

| | Lbs./Acre | Field Dodder | | Wild Oats | | Jimson Weed | |
|---|---|---|---|---|---|---|---|
| | | Pre | Post | Pre | Post | Pre | Post |
| Compound [1] | 1 | 3 | 2 | 2 | 2 | 2 | 4 |

[1] Bis (tributyl) tin fructose 1,3-dimercapto propane mercaptole.

EXAMPLE 9

Slimicide

The standard slimicide test for organisms of economic importance in pulp and paper industry using standard culture media, the minimum concentration of compound which will completely inhibit organism growth is determined.

Compound:[1]    Minimum inhibitory concentration (p.p.m.)

- A. niger _____ 2
- P. expansum _____ <1
- Aerobacter aerogenos _____ >512
- Bacillus mycoides _____ <1

[1] Bis (tributyl) tin fructose 1,3-dimercaptopropane mercaptole.

What is claimed is:
1. A compound having the fomula:

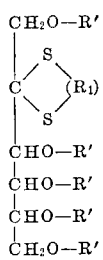

wherein R' is selected from the group consisting of hydrogen and trialkyl tin radicals each alkyl group of which contains 1–10 carbon atoms and at least one R' is a trialkyl tin radical; and $R_1$ is selected from the group consisting of $C_1$–$C_{10}$ divalent aliphatic, and $C_3$–$C_{10}$ divalent cycloaliphatic radicals.

2. The compound of claim 1 wherein each alkyl group of R' contains from 1–6 carbon atoms and $R_1$ is $C_2$–$C_{10}$ aliphatic radical.

3. The compound of claim 1 wherein the cyclic structure:

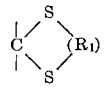

contains from 4 to 10 members.

4. Bis tributylstannloxy fructose 1,3-dimercapto propane mercaptole.

5. Bis tributylstannyloxy fructose 1,2-dimercaptopropane mercaptole.

6. A composition of matter having the generic formula:

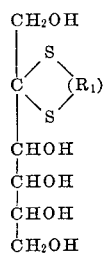

wherein $R_1$ is selected from the goup consisting of $C_1$–$C_{10}$ divalent aliphatic, and $C_3$–$C_{10}$ divalent cycloaliphatic radicals.

References Cited

UNITED STATES PATENTS

| 3,213,119 | 10/1965 | Wilson | 260—429.7 |
| 3,242,201 | 3/1966 | Cramer et al. | 260—429.7 |

OTHER REFERENCES

Cox: "Jour. Chem. Soc." 1967, p. 1121–1125.

LEWIS GOTTS, Primary Examiner

J. R. BROWN, Assistant Examiner

U.S. Cl. X.R.

71—90; 260—327; 424—180, 277